United States Patent
Schulte et al.

(10) Patent No.: US 7,593,978 B2
(45) Date of Patent: Sep. 22, 2009

(54) PROCESSOR REDUCTION UNIT FOR ACCUMULATION OF MULTIPLE OPERANDS WITH OR WITHOUT SATURATION

(75) Inventors: Michael J. Schulte, Madison, WI (US); Pablo I. Balzola, Nanuet, NY (US); C. John Glossner, Carmel, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 841 days.

(21) Appl. No.: 10/841,261

(22) Filed: May 7, 2004

(65) Prior Publication Data

US 2005/0071413 A1 Mar. 31, 2005

Related U.S. Application Data (60) Provisional application No. 60/469,253, filed on May 9, 2003.

(51) Int. Cl.
*G06F 15/00* (2006.01)
(52) U.S. Cl. ...................................................... 708/603
(58) Field of Classification Search .................. 708/523, 708/603
See application file for complete search history.

(56) References Cited

U.S. PATENT DOCUMENTS

| | | | | |
|---|---|---|---|---|
| 4,706,211 A | * | 11/1987 | Yamazaki et al. | 708/630 |
| 5,181,184 A | * | 1/1993 | Shim et al. | 708/626 |
| 5,613,114 A | * | 3/1997 | Anderson et al. | 718/108 |
| 5,864,703 A | | 1/1999 | van Hook et al. | |
| 5,889,689 A | | 3/1999 | Alidina et al. | |
| 6,078,941 A | | 6/2000 | Jiang et al. | |
| 6,182,105 B1 | | 1/2001 | Kolagotla et al. | |
| 6,377,619 B1 | | 4/2002 | Denk et al. | |
| 2003/0120901 A1 | | 6/2003 | Hokenek et al. | |
| 2004/0073781 A1 | | 4/2004 | Hokenek et al. | |

OTHER PUBLICATIONS

K. Diefendorff et al., "AltiVec Extension to PowerPC Accelerates Media Processing," IEEE Micro, vol. 20, No. 2, pp. 85-95, Mar. 2000.
A. Peleg et al., "MMX Technology Extension to the Intel Architecture," IEEE Micro, vol. 16, No. 4, pp. 42-50, 1996.
N. Yadav et al., "Parallel Saturating Fractional Arithmetic Units," Proceedings of the Ninth Great Lakes Symposium on VLSI, pp. 214-217, Mar. 1999.
M. Schulte et al., "Parallel Saturating Multioperand Adders," Proceedings of the International Conference on Compilers, Architectures and Synthesis for Embedded Systems, San Jose, California, pp. 172-179, Nov. 2000.

(Continued)

*Primary Examiner*—Chuong D Ngo
(74) *Attorney, Agent, or Firm*—Lowenstein Sandler, PC (57) ABSTRACT

A processor having a reduction unit that sums m input operands plus an accumulator value, with the option of saturating after each addition or wrapping around the result of each addition. The reduction unit also allows the m input operands to be subtracted from the accumulator value by simply inverting the bits of the input operands and setting a carry into each of a plurality of reduction adders to one. The reduction unit can be used in conjunction with m parallel multipliers to quickly perform dot products and other vector operations with either saturating or wrap-around arithmetic.

17 Claims, 5 Drawing Sheets

OTHER PUBLICATIONS

P.I. Balzola et al., "Design Alternatives for Parallel Saturating Multioperand Adders," International Conference on Computer Design, VLSI in Computers & Processors, Austin, Texas, pp. 172-177, Sep. 2001.

J. Glossner et al., "Towards a Very High Bandwidth Wireless Battery Powered Device," IEEE Computer Society Workshop on VLSI, pp. 3-9, Apr. 2001.

J. Glossner et al., "A Software Defined Communications Baseband Design," IEEE Communications Magazine, vol. 41, No. 1, pp. 120-128, Jan. 2003.

J. Glossner et al., "A Multithreaded Processor Architecture for SDR," the Proceedings of the Korean Institute of Communication Sciences, vol. 19, No. 11, pp. 70-84, Nov. 2002.

D.M. Tullsen et al., "Simultaneous Multithreading: Maximizing On-Chip Parallelism," $22^{nd}$ Annual International Symposium on Computer Architecture, pp. 392-403, Jun. 1995.

R.B. Lee, "Subword Permutation Instructions for Two-Dimensional Multimedia Processing in MicroSIMD Architectures," Proceedings of the IEEE $11^{th}$ International Conference on Application-Specific Systems, Architectures and Processor, pp. 3-14, Jul. 2000.

Y. Kim et al., "A Low Power Carry Select Adder with Reduced Area," Proceedings of IEEE International Symposium on Circuits and Systems, pp. IV-218-IV-221, 2001.

A. Tyagi, "A Reduced-Area Scheme for Carry-Select Adders," IEEE Transactions on Computers, vol. 42, No. 10, pp. 1163-1170, Oct. 1993.

P.I. Balzola, "Saturating Arithmetic for Digital Signal Processors," Ph.D. Thesis, Lehigh University, Apr. 2003.

\* cited by examiner

| OPCODE | ACCD | ACCS | VRSA | VRSB |

FIG. 6

| IFE | DEC | RVF | ML1 | ML2 | AD1 | AD2 | RE1 | RE2 | RE3 | RE4 | XFR | WAF |
| RAF |

| IFE | DEC | RVF | ML1 | ML2 | AD2 | AD3 | RE1 | RE2 | RE3 | RE4 | XFR | WAF |
| RAF |

PROCESSOR REDUCTION UNIT FOR ACCUMULATION OF MULTIPLE OPERANDS WITH OR WITHOUT SATURATION

RELATED APPLICATION

The present application claims the priority of U.S. Provisional Application Ser. No. 60/469,253, filed May 9, 2003 in the name of M. J. Schulte et al. and entitled "Method and Apparatus to Accumulate Multiple Operands with or without Saturation in a Multithreaded Processor," which is incorporated by reference herein.

FIELD OF THE INVENTION

The present invention relates generally to the field of digital data processors, and more particularly to arithmetic processing operations and associated processing circuitry for use in a digital signal processor (DSP) or other type of digital data processor.

BACKGROUND OF THE INVENTION

Many digital data processors, including most DSPs and multimedia processors, use binary fixed-point arithmetic, in which operations are performed on integers, fractions, or mixed numbers in unsigned or two's complement binary format. DSP and multimedia applications often require that the processor be configured to perform both saturating arithmetic and wrap-around arithmetic on binary numbers.

In saturating arithmetic, computation results that are too large to be represented in a specified number format are saturated to the most positive or most negative number. When a result is too large to represent, overflow occurs. For example, in a decimal number system with 3-digit unsigned numbers, the addition 733+444 produces a saturated result of 999, since the true result of 1177 cannot be represented with just three decimal digits. The saturated result, 999, corresponds to the most positive number that can be represented with three decimal digits. Saturation is useful because it reduces the errors that occur when results cannot be correctly represented, and it preserves sign information.

In wrap-around arithmetic, results that overflow are wrapped around, such that any digits that cannot fit into the specified number representation are simply discarded. For example, in a decimal number system with 3-digit unsigned numbers, the addition 733+444 produces a wrap-around result of 177. Since the true result of 1177 is too large to represent, the leading 1 is discarded and a result of 177 is produced. Wrap-around arithmetic is useful because, if the true final result of several wrap-around operations can be represented in the specified format, the final result will be correct, even if intermediate operations overflow.

As indicated above, saturating arithmetic and wrap-around arithmetic are often utilized in binary number systems. For example, in a two's complement fractional number system with 4-bit numbers, the two's complement addition 0.101+0.100 (0.625+0.500) produces a saturated result of 0.111 (0.875), which corresponds to the most positive two's complement number that can be represented with four bits. If wrap-around arithmetic is used, the two's complement addition 0.101+0.100 (0.625+0.500), produces the result 1.001 (−0.875).

Additional details regarding these and other conventional aspects of digital data processor arithmetic can be found in, for example, B. Parhami, "Computer Arithmetic: Algorithms and Hardware Designs," Oxford University Press, New York, 2000 (ISBN 0-19-512583-5), which is incorporated by reference herein.

Many digital signal processing and multimedia applications require the functionality of both saturating arithmetic and wrap-around arithmetic. However, many conventional techniques are unable to provide an efficient mechanism for controllable selection of saturating or wrap-around arithmetic.

It may also be desirable in many applications to configure a given DSP, multimedia processor or other type of digital data processor for the computation of dot products. The dot product of two k-element vectors $$X=[X[1], X[2], \ldots, X[k-1], X[k]] \text{ and } Y=[Y[1], Y[2], \ldots, Y[k-1], Y[k]]$$

is given by $$Z=X[1]*Y[1]+X[2]*Y[2]+\ldots+X[k-1]*Y[k-1]+X[k]*Y[k].$$

Thus, a k-element dot product requires k multiplications and (k−1) additions. Such dot products frequently occur in digital signal processing and multimedia applications.

By way of example, second and third generation cellular telephones that support GSM (Global System for Mobile communications) or EDGE (Enhanced Data rates for Global Evolution) standards make extensive use of dot products, usually with saturation after each addition and each multiplication. These standards generally require that the final results of a given dot product computation be identical (i.e., bit-exact) to the results that would be obtained when operations are performed serially, with saturating after each operation. Since saturating addition is not associative, the additions needed for the dot product are typically performed in series, which adversely impacts processor performance.

Another problem with conventional techniques for dot product computation and other vector operations is that such techniques are not readily adaptable for use in a pipelined processor. For example, certain conventional techniques may be difficult to extend to pipelines with more than two pipeline stages, since doing so will generally result in a substantial increase in the required circuit area.

Furthermore, the conventional techniques generally fail to provide a suitably efficient mechanism for supporting both the addition of operands to an accumulator value and the subtraction of operands from an accumulator value.

Accordingly, techniques are needed which can provide improved computation of dot products and other types of vector operations with either saturating or wrap-around arithmetic in a digital data processor.

SUMMARY OF THE INVENTION

The present invention in an illustrative embodiment provides a processor having a reduction unit that sums m input operands plus an accumulator value, with the option of saturating after each addition or wrapping around the result of each addition. The reduction unit also allows the m input operands to be subtracted from the accumulator value by simply inverting the bits of the input operands and setting the carry into each of a plurality of reduction adders to one. The reduction unit can be used in conjunction with m parallel multipliers to quickly perform dot products and other vector operations with either saturating or wrap-around arithmetic.

In a multithreaded processor implementation, the reduction unit can be pipelined to achieve a low worst case delay, yet still allow m elements of a dot product to be accumulated every clock cycle.

For saturating dot products, the results produced by the reduction unit are identical to the results produced when operations are performed serially, with saturating after each operation. This functionality is particularly useful in digital signal processing and multimedia applications, which frequently perform saturating dot products.

Although one use of the reduction unit of the illustrative embodiment is in computing dot products, with or without saturation, there are numerous other potential uses including summing a vector of operands, performing complex multiply-accumulate (MAC) operations, and subtracting operands from an accumulator value.

When used to perform dot products, the reduction unit of the illustrative embodiment can operate along with m parallel multipliers, where each multiplier computes a product $X[i]*Y[i]$, where $i=1, 2 \ldots m$. The m products from the multipliers then become the m input operands to the reduction unit, and are summed along with an accumulator value, which is set to zero for an initial iteration. In the next iteration, the output of the reduction unit from the previous iteration becomes the accumulator value and m new products are computed. In this way, a k-element dot product can be computed using $\lceil k/m \rceil$ iterations, where each iteration includes m parallel multiplies and an (m+1)-input addition. When used in a saturation mode, the reduction unit performs saturation after each addition, and each multiplier saturates its result when overflow occurs.

The present invention in the illustrative embodiment provides a number of significant advantages relative to conventional techniques. For example, the reduction unit can be readily pipelined, without a performance penalty and with only a modest increase in required circuit area. In addition, the reduction unit directly supports both saturating and wrap-around arithmetic, and allows the addition of operands to an accumulator value as well as the subtraction of operands from an accumulator value.

DETAILED DESCRIPTION OF THE INVENTION

The present invention will be described in the context of an exemplary reduction unit, accumulator unit, and arithmetic units, and a multithreaded processor which incorporates such units. It should be understood, however, that the invention does not require the particular arrangements shown, and can be implemented using other types of digital data processors and associated processing circuitry.

A given processor as described herein may be implemented in the form of one or more integrated circuits.

Figure 1:
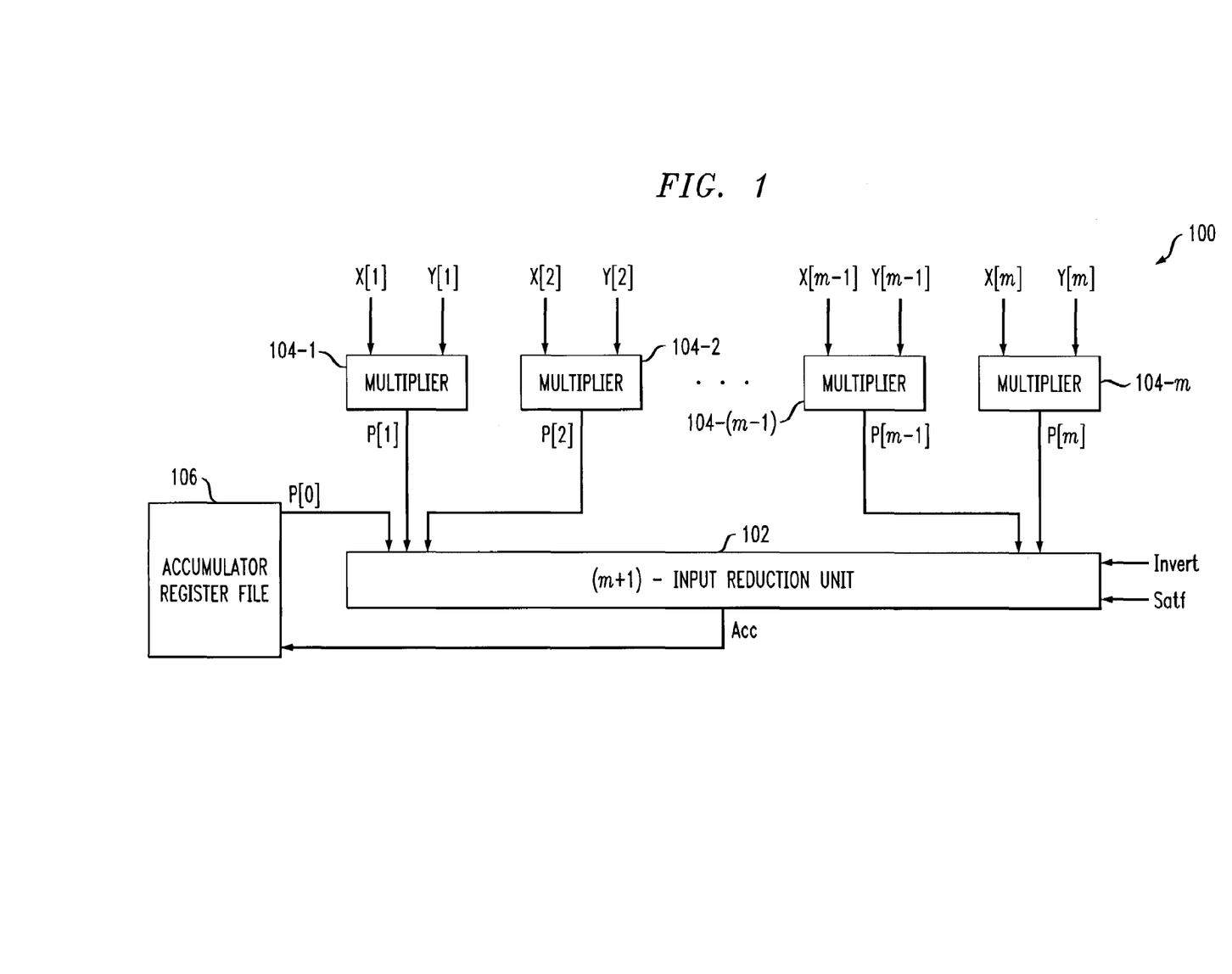
FIG. 1 shows a portion of an exemplary processor incorporating a reduction unit in accordance with an illustrative embodiment of the invention, and more particularly shows the manner in which the reduction unit may be used to compute a dot product.

FIG. 1 shows a portion of a processor 100 configured in accordance with an illustrative embodiment of the invention. The processor 100 includes an (m+1)-input reduction unit 102 coupled between m parallel multipliers, denoted 104-1, 104-2, . . . 104-m, and an accumulator register file 106.

Each of the multipliers 104-i computes $P[i]=X[i]*Y[i]$, $1 \leq i \leq m$, with or without saturation. The m multiplier outputs are then fed as input operands to the (m+1)-input reduction unit 102, along with an accumulator value, denoted P[0], from the accumulator register file 106. The reduction unit 102 computes $$Acc = P[0]+P[1]+P[2]+ \ldots +P[m],$$

where P[0] is set to zero for an initial iteration. In the next iteration, m new elements of X and Y are multiplied, and P[0] is set to the accumulator value, Acc, from the previous iteration. This process continues until the entire dot product is computed. Thus, a k-element dot product can be computed using $\lceil k/m \rceil$ iterations, where each iteration includes m parallel multiplies and an (m+1)-input addition. When used in a saturation mode, the reduction unit performs saturation after each addition, and each multiplier saturates its result when overflow occurs.

The accumulator register file 106 may be viewed as an example of what is more generally referred to herein as an "accumulator unit." Other types of accumulator units may be used in alternative embodiments, as will be appreciated by those skilled in the art. Moreover, the term "unit" as used herein is intended to be construed generally, such that elements of a given unit may but need not be co-located with one another or otherwise have a particular physical relationship to one another. For example, elements of a given unit could be distributed throughout an integrated circuit, rather than co-located at one site in such a circuit.

The accumulator register file 106 can be used to store intermediate accumulator values, which is especially useful in a multi-threaded processor implementation, in which several dot products from individual threads may be computed simultaneously.

The reduction unit 102 in the illustrative embodiment of FIG. 1 also receives two 1-bit control signal inputs, Invert and Satf. When Invert is high, the input operands to the reduction unit are inverted, so that the unit computes $$Acc = P[0]-P[1]-P[2]- \ldots -P[m].$$

When Invert is low, the input operands to the reduction unit are not inverted, so the unit computes $$Acc = P[0]+P[1]+P[2]+ \ldots +P[m].$$

When Satf is high, the reduction unit is in saturation mode. This means that after each intermediate addition in the reduction unit a check is made to determine if the result has incurred overflows. If it has, the result is saturated to the most positive or most negative number in the specified format. When Satf is low, the reduction unit is in wrap-around mode, which means that results that overflow are not saturated.

The use of multipliers 104 in the illustrative embodiment is by way of example only. Other embodiments may use, for example, multiply-accumulate (MAC) units. The term "multiplier" as used herein is intended to include an arithmetic unit, such as a MAC unit, which performs multiplication as well as one or more other functions.

Figure 2:
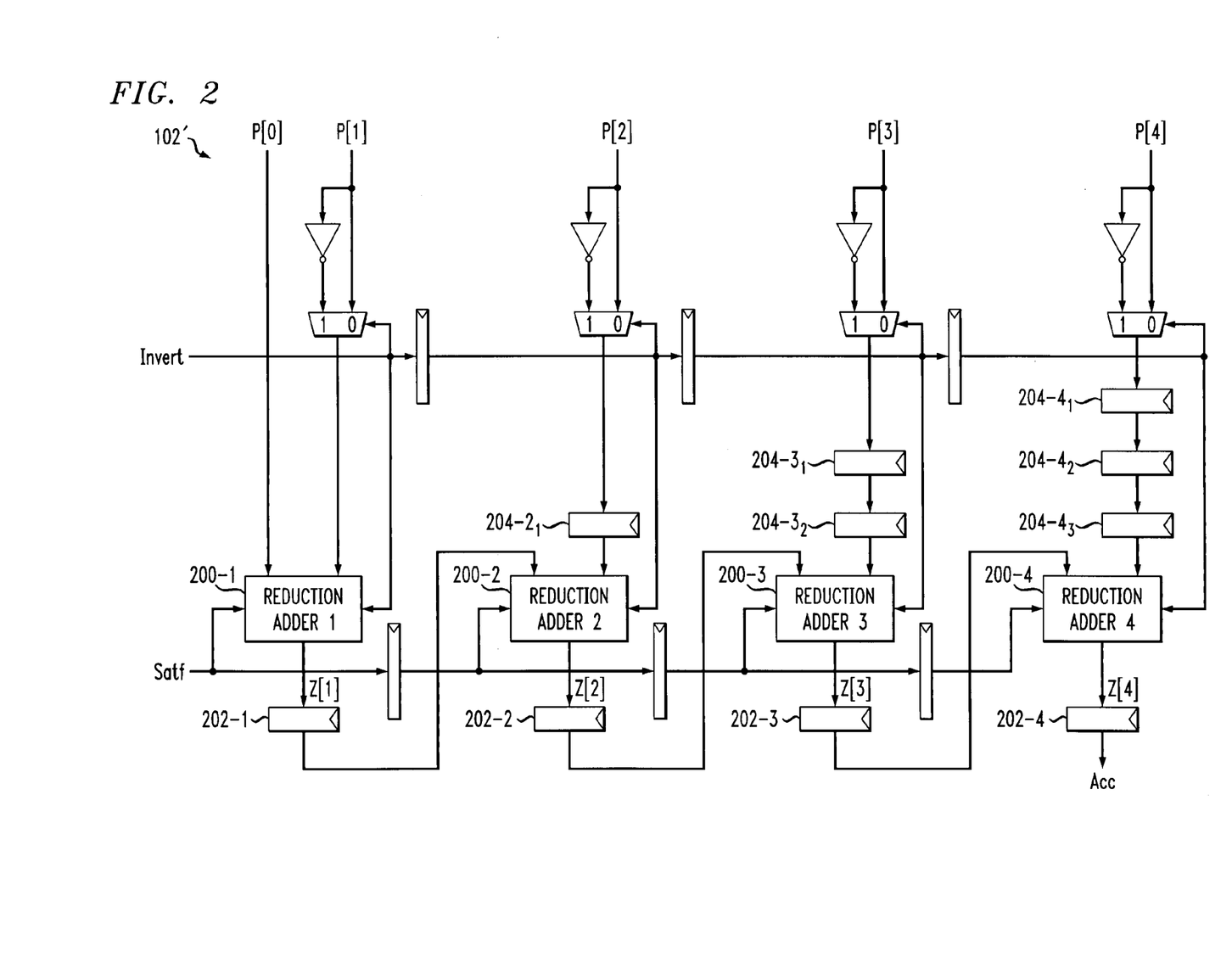
FIG. 2 shows a more detailed view of the FIG. 1 reduction unit as implemented for a case of m=4 in the illustrative embodiment.

FIG. 2 shows an exemplary reduction unit 102' suitable for use in the processor 100 and more specifically configured for the case of m=4. This reduction unit is operative to sum four input operands, P[1] to P[4], plus an accumulator value, P[0]. Although the figure shows an (m+1)-input reduction unit for the specific case of m=4, the design can easily be extended to other values of m, as will be apparent to those skilled in the art.

The reduction unit 102' uses four 2-input reduction adders, denoted 200-1, 200-2, 200-3 and 200-4, which are connected in series as shown. Each reduction adder is able to add its input operands with or without saturation. The term "reduction adder" as used herein is intended to include, by way of example, a saturating adder.

The first reduction adder 200-1, also identified as Reduction Adder 1, takes operands P[0] and P[1], and adds them to produce Z[1]=P[0]+P[1], when the input control signal Invert is low. Each remaining reduction adder 200-(i+1), also identified as Reduction Adder i+1, takes two input operands, Z[i] and P[i+1], and adds them to produce a sum, Z[i+1]=Z[i]+P[i+1], when the input control signal Invert is low. Thus, when Invert is low, the output of the reduction unit is Acc=Z[4]=P[0]+P[1]+P[2]+P[3]+P[4].

When the input control signal Invert is high, the second input to each reduction adder is bit-wise inverted and the carry-input to each reduction adder is set to one. This causes Reduction Adder 1 to compute Z[1]=P[0]−P[1] and the remaining reduction adders to compute Z[i+1]=Z[i]−P[i+1]. In this case, the output of the reduction unit is Acc=Z[4]=P[0]−P[1]−P[2]−P[3]−P[4].

When the input control signal Satf is high, the result of each addition (or subtraction) is saturated when overflow occurs. When Satf is low, the result of each addition (or subtraction) is wrapped around.

The reduction unit 102' is pipelined to decrease its worst case delay. More specifically, the reduction unit 102' uses a four-stage pipeline to perform four additions (or four subtractions), where the result of each intermediate addition (or subtraction), Z[i], is stored in a pipeline register 202-i. To have the P[i] operands arrive at the same time as the corresponding Z[i−1] operands, the P[i] operand into Reduction Adder i passes through (i−1) pipeline registers 204. Thus, operand P[1] passes through no pipeline registers 204, operand P[2] passes through one pipeline register 204-$2_1$, operand P[3] passes through two pipeline registers 204-$3_1$ and 204-$3_2$, and operand P[4] passes through three pipeline registers 204-$4_1$, 204-$4_2$ and 204-$4_3$, in reaching their respective reduction adders.

Figure 3:
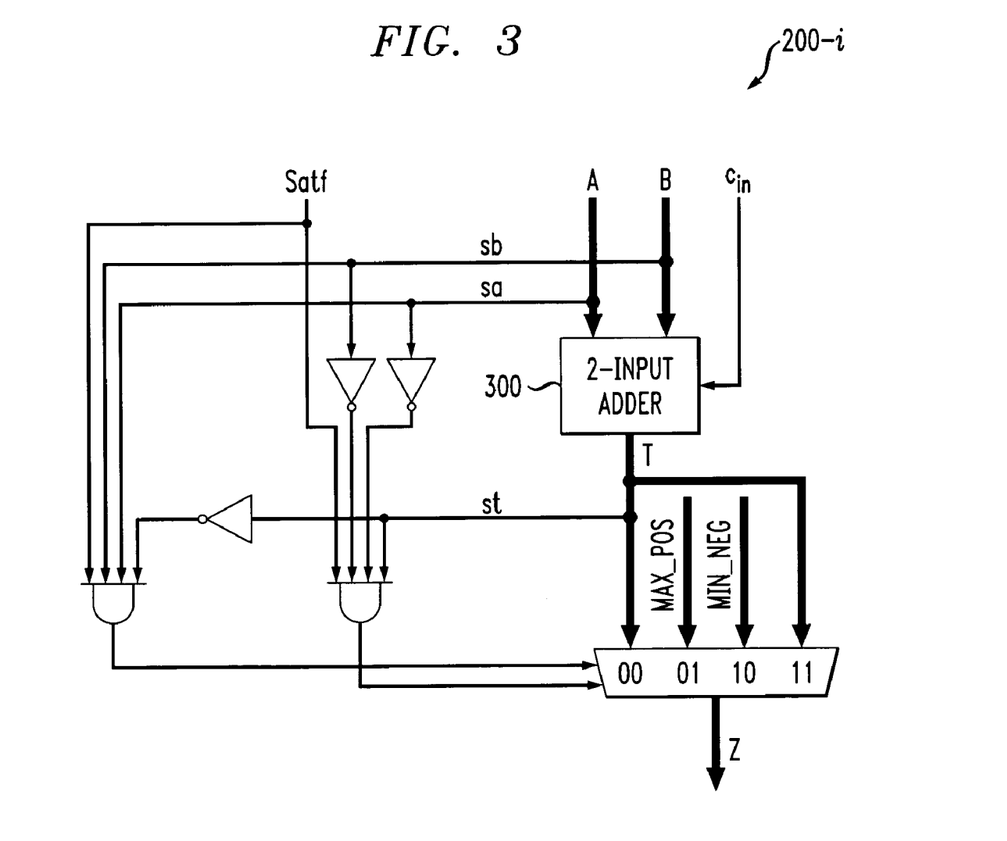
FIG. 3 shows a more detailed view of a reduction adder utilized in the FIG. 2 reduction unit.

FIG. 3 shows one possible implementation of a given one of the reduction adders 200-i of the reduction unit 102'. The reduction adder 200-i uses a 2-input adder 300 to add two input operands, A and B, plus a carry-in bit, $c_{in}$, to compute T=A+B+$c_{in}$. If Satf and the signs of A and B, sa and sb, are high, and the sign of the temporary result, st, is low, the output, Z, is saturated to the most negative number in the specified number format, such that Z=MIN_NEG. If Satf and st are high and sa and sb are low, Z is saturated to the most positive number in the specified number format, such that Z=MAX_POS. In all other cases the result from the adder 300 is used as the result, such that Z=T.

It should be understood that the particular reduction adder design shown in FIG. 3 is presented by way of illustrative example only. Numerous alternative reduction adder designs may be used, and the particular adder selected for use in a given implementation may vary based on application-specific factors such as the format of the input operands.

In the pipelined reduction unit, it is possible for m elements of a dot product to be accumulated every clock cycle, through the use of multithreading as described below.

It should be noted that, in non-multithreaded processor implementations, pipelining the reduction unit can cause a large increase in the number of cycles needed to compute each dot product. For example, using a conventional m-stage pipeline without multithreading increases the number of cycles to compute each dot product by roughly a factor of m.

The illustrative embodiment of the present invention addresses this issue by utilizing an approach known as token triggered threading. Token triggered threading is described in U.S. Pat. No. 6,842,848 (hereinafter, "the '848 Patent"), which is commonly assigned herewith and incorporated by reference herein. The token triggered threading typically assigns different tokens to each of a plurality of threads of a multithreaded processor. For example, the token triggered threading may utilize a token to identify in association with a current processor clock cycle a particular one of the threads of the processor that will be permitted to issue an instruction for a subsequent clock cycle. Although token triggered threading is used in the illustrative embodiment, the invention does not require this particular type of multithreading, and other types of multithreading techniques can be used.

In the illustrative embodiment, the above-noted increase in cycle count attributable to pipelining may be effectively hidden by the processing of other threads, since the multiplications and reductions for one dot product are executed concurrently with operations from other threads. In order to completely hide the increase in cycle count by concurrent execution of threads, the number of cycles between execution of instructions from a given thread should be greater than or equal to the number of pipeline stages in the reduction unit plus any additional cycles needed to write to and read from the accumulator register file 106.

As indicated previously, the present invention can be advantageously implemented in a multithreaded processor. A more particular example of a multithreaded processor in which the invention may be implemented is described in U.S. Pat. No. 6,968,445 (hereinafter, "the '445 Patent"), which is commonly assigned herewith and incorporated by reference herein. This multithreaded processor may be configured to execute RISC-based control code, DSP code, Java code and network processing code. It includes a single instruction multiple data (SIMD) vector processing unit, a reduction unit, and long instruction word (LIW) compounded instruction execution. Examples of threading and pipelining techniques suitable for use with this exemplary multithreaded processor are described in the above-cited '848 Patent.

Figure 4:
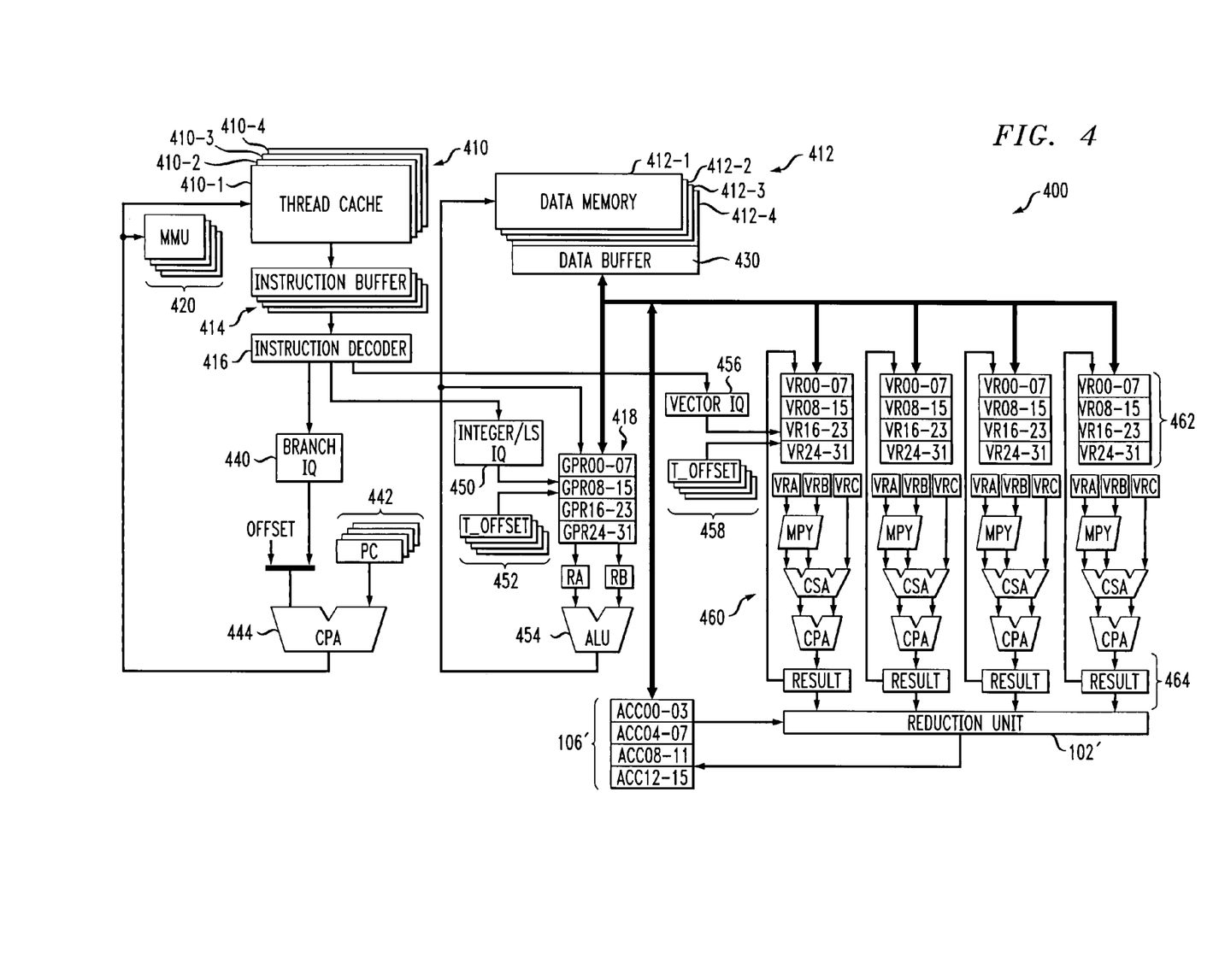
FIG. 4 shows an example of a multithreaded processor incorporating the FIG. 2 reduction unit.

The reduction unit 102 or 102' as described herein may be utilized as the reduction unit in such a multithreaded processor, as will be illustrated in conjunction with FIG. 4. Of course, the invention can be implemented in other multithreaded processors, or more generally other types of digital data processors.

FIG. 4 shows an example of a multithreaded processor 400 incorporating the FIG. 2 reduction unit 102'. The processor 400 is generally similar to that described in the '445 Patent, but incorporates reduction unit 102' and accumulator register file 106' configured as described herein.

The multithreaded processor 400 includes, among other elements, a multithreaded cache memory 410, a multithreaded data memory 412, an instruction buffer 414, an instruction decoder 416, a register file 418, and a memory management unit (MMU) 420. The multithreaded cache 410 includes a plurality of thread caches 410-1, 410-2, . . . 410-N, where N generally denotes the number of threads supported by the multithreaded processor 400, and in this particular example is given by N=4. Of course, other values of N may be used, as will be readily apparent to those skilled in the art.

Each thread thus has a corresponding thread cache associated therewith in the multithreaded cache 410. Similarly, the data memory 412 includes N distinct data memory instances, denoted data memories 412-1, 412-2, . . . 412-N as shown.

The multithreaded cache 410 interfaces with a main memory (not shown) external to the processor 400 via the MMU 420. The MMU 420, like the cache 410, includes a separate instance for the each of the N threads supported by the processor. The MMU 420 ensures that the appropriate instructions from main memory are loaded into the multithreaded cache 410.

The data memory 412 is also typically directly connected to the above-noted external main memory, although this connection is also not explicitly shown in the figure. Also associated with the data memory 412 is a data buffer 430.

In general, the multithreaded cache 410 is used to store instructions to be executed by the multithreaded processor 400, while the data memory 412 stores data that is operated on by the instructions. Instructions are fetched from the multithreaded cache 410 by the instruction decoder 416 and decoded. Depending upon the instruction type, the instruction decoder 416 may forward a given instruction or associated information to various other units within the processor, as will be described below.

The processor 400 includes a branch instruction queue (IQ) 440 and program counter (PC) registers 442. The program counter registers 442 include one instance for each of the threads. The branch instruction queue 440 receives instructions from the instruction decoder 416, and in conjunction with the program counter registers 442 provides input to an adder block 444, which illustratively comprises a carry-propagate adder (CPA). Elements 440, 442 and 444 collectively comprise a branch unit of the processor 400. Although not shown in the figure, auxiliary registers may also be included in the processor 400.

The register file 418 provides temporary storage of integer results. Instructions forwarded from the instruction decoder 416 to an integer instruction queue (IQ) 450 are decoded and the proper hardware thread unit is selected through the use of an offset unit 452 which is shown as including a separate instance for each of the threads. The offset unit 452 inserts explicit bits into register file addresses so that independent thread data is not corrupted. For a given thread, these explicit bits may comprise, e.g., a corresponding thread identifier.

As shown in the figure, the register file 418 is coupled to input registers RA and RB, the outputs of which are coupled to an ALU block 454, which may comprise an adder. The input registers RA and RB are used in implementing instruction pipelining. The output of the ALU block 454 is coupled to the data memory 412.

The register file 418, integer instruction queue 450, offset unit 452, elements RA and RB, and ALU block 454 collectively comprise an exemplary integer unit.

Instruction types executable in the processor 400 include Branch, Load, Store, Integer and Vector/SIMD instruction types. If a given instruction does not specify a Branch, Load, Store or Integer operation, it is a Vector/SIMD instruction. Other instruction types can also or alternatively be used. The Integer and Vector/SIMD instruction types are examples of what are more generally referred to herein as integer and vector instruction types, respectively.

A vector IQ 456 receives Vector/SIMD instructions forwarded from the instruction decoder 416. A corresponding offset unit 458, shown as including a separate instance for each of the threads, serves to insert the appropriate bits to ensure that independent thread data is not corrupted.

A vector unit 460 of the processor 400 is separated into N distinct parallel portions, and includes a vector file 462 which is similarly divided. The vector file 462 includes thirty-two registers, denoted VR00 through VR31. The vector file 462 serves substantially the same purpose as the register file 418 except that the former operates on Vector/SIMD instruction types.

The vector unit 460 illustratively comprises the vector instruction queue 456, the offset unit 458, the vector file 462, and the arithmetic and storage elements associated therewith.

The operation of the vector unit 460 is as follows. A Vector/SIMD block encoded either as a fractional or integer data type is read from the vector file 462 and is stored into architecturally visible registers VRA, VRB, VRC. From there, the flow proceeds through multipliers (MPY) that perform parallel concurrent multiplication of the Vector/SIMD data. Adder units comprising carry-skip adders (CSAs) and CPAs may perform additional arithmetic operations. For example, one or more of the CSAs may be used to add in an accumulator value from a vector register file, and one or more of the CPAs may be used to perform a final addition for completion of a multiplication operation, as will be appreciated by those skilled in the art. Computation results are stored in Result registers 464, and are provided as input operands to the reduction unit 102'. The reduction unit 102' sums the input operands in such a way that the summation result produced is the same as that which would be obtained if each operation were executed in series. The reduced sum is stored in the accumulator register file 106' for further processing.

When performing vector dot products, the MPY blocks perform four multiplies in parallel, the CSA and CPA units perform additional operations or simply pass along the multiplication results for storage in the Result registers 464, and the reduction unit 102' sums the multiplication results, along with an accumulator value stored in the accumulator register file 106'. The result generated by the reduction unit is then stored in the accumulator register file for use in the next iteration, in the manner previously described.

The four parallel multipliers MPY of the vector unit 460 may be viewed as corresponding generally to the multipliers 104 of processor 100 of FIG. 1.

The accumulator register file 106' in this example includes a total of sixteen accumulator registers denoted ACC00 through ACC15.

The multithreaded processor 400 may make use of techniques for thread-based access to register files, as described in U.S. Pat. No. 6,904,511, which is commonly assigned herewith and incorporated by reference herein.

Figure 5:
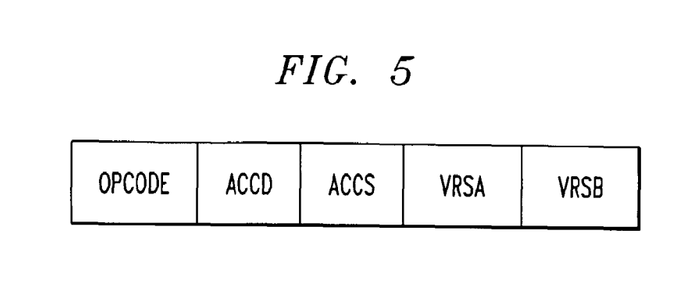
FIG. 5 shows an exemplary format for a vector-reduce instruction suitable for execution in the FIG. 4 multithreaded processor.

FIG. 5 shows an exemplary format for a vector-reduce instruction suitable for execution in the multithreaded processor 400 of FIG. 4. This instruction is used to specify vector-reduce operations performed by the parallel multipliers and the reduction unit. In the figure, OPCODE specifies the operation to be performed, ACCD specifies the accumulator register file location of the accumulator destination register, ACCS specifies the accumulator register file location of the accumulator source register, VRSA specifies the vector register file locations of one set of vector source operands, and VRSB specifies the vector register file locations of the other set of vector source operands.

Using the instruction format shown in FIG. 5, a SIMD vector processing unit with m parallel multipliers and an (m+1)-input reduction unit can perform a vector-multiply-and-reduce-add (vmulredadd) instruction, which computes ACCD=ACCS+VRSA[1]*VRSB[1]+VRSA[2]
*VSRB[2]+ . . . +VSRA[m]*VSRB[m].

More specifically, with reference to the exemplary multi-threaded processor 400, this instruction can be executed for m=4 by reading the values corresponding to VSRA[i] and VSRB[i] from the vector register files 462, using the four parallel multipliers MPY to compute VSRA[i]*VSRB[i], reading ACCS from the accumulator register file 106', using the reduction unit 102' to add the products to ACCS, and writing the result from the reduction unit to back to the accumulator register file, using the address specified by ACCD.

Similarly, a vector-multiply-and-reduce-subtract (vmulredsub) instruction can perform the computation ACCD=ACCS−VRSA[1]*VRSB[1]−VRSA[2]
*VSRB[2]− . . . −VSRA[m]*VSRB[m].

Each of these vector-reduce instructions can also be performed with saturation after each operation. Other vector-reduce instructions, such as vector-add-reduce-add, which performs the operation ACCD=ACCS+VRSA[1]+VRSB[1]+VRSA[2]+
VSRB[2]+ . . . +VSRA[m]+VSRB[m], can also be defined, as will be apparent to those skilled in the art.

Figure 6:
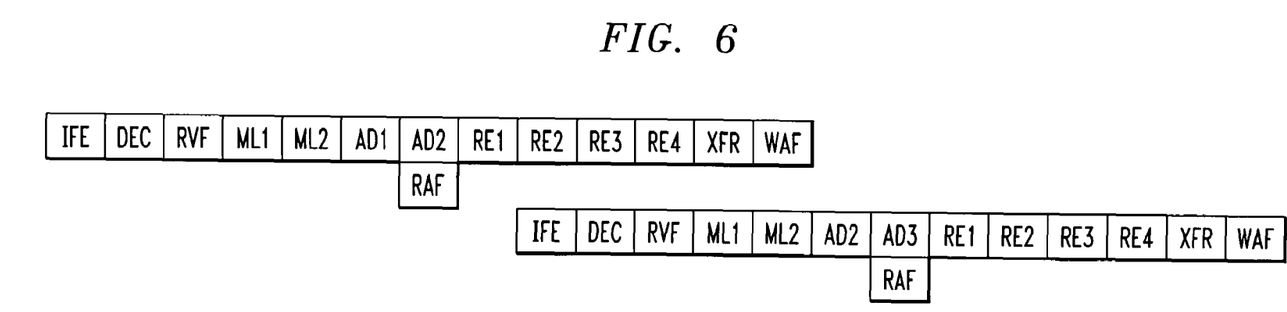
FIG. 6 illustrates pipelined execution of two vector-reduce instructions from the same thread, utilizing an instruction format of the type shown in FIG. 5.

FIG. 6 illustrates pipelined execution of two vector-reduce instructions from the same thread, utilizing an instruction format of the type shown in FIG. 5. In this example, it is assumed without limitation that there are a total of eight threads, and that token triggered threading is used, with round-robin scheduling. The instructions issued by the other threads are not shown in this figure. The pipeline in this example includes 13 stages: instruction fetch (IFE), instruction decode (DEC), read vector register file (RVF), two multiply stages (ML1 and ML2), two adder stages (AD1 and AD2), four reduce stages (RE1 through RE4), result transfer (XFR), and write accumulator file (WAF). In the same cycle with the second adder stage (AD2), the processor also reads the accumulator register file (RAF). Thus, a given one of the vector-reduce instructions takes 13 cycles to execute.

It is important to note with regard to this example that if two vector-reduce instruction issue one after the other from the same thread, the first vector-reduce instruction has already written its destination accumulator result back to the accumulator register file (in stage WAF) before the next vector-reduce instruction needs to read its accumulator source register from the register file. Thus two instructions, such as vmulredadd acc0, acc0, vr1, vr2 vmulredadd acc0, acc0, vr3, vr4 which use the instruction format shown in FIG. 5, can be issued as consecutive instructions, without causing the processor to stall due to data dependencies. This type of feature can be provided in alternative embodiments using different multithreaded processor, pipeline and reduction unit configurations, as well as different instruction formats.

The present invention in the illustrative embodiment described above provides a number of significant advantages relative to conventional techniques. For example, the reduction unit can be readily pipelined, without a performance penalty and with only a modest increase in required circuit area relative to conventional techniques. In addition, the reduction unit directly supports both saturating and wrap-around arithmetic, and allows the addition of operands to an accumulator value as well as the subtraction of operands from an accumulator value.

Since digital signal processing and multimedia applications may require the functionality of saturating arithmetic and wrap-around arithmetic, a significant reduction in cost is achieved by utilizing a reduction unit of the type described herein that performs either saturating or wrap-around arithmetic based on a control bit input.

It should be noted that the particular circuitry arrangements shown in FIGS. 1 through 4 are presented by way of illustrative example only, and additional or alternative elements not explicitly shown may be included, as will be apparent to those skilled in the art.

It should also be emphasized that the present invention does not require the particular multithreaded processor configuration shown in FIG. 4. The invention can be implemented in a wide variety of other multithreaded or non-multithreaded processor configurations.

Thus, the above-described embodiments of the invention are intended to be illustrative only, and numerous alternative embodiments within the scope of the appended claims will be apparent to those skilled in the art. For example, the particular arithmetic unit, reduction unit and accumulator unit configurations shown may be altered in other embodiments. Also, as noted above, pipeline configurations, threading types and instruction formats may be varied to accommodate the particular needs of a given application.

What is claimed is:

1. A multithreaded processor comprising:
   a plurality of arithmetic units;
   an accumulator unit; and
   a reduction unit coupled between the plurality of arithmetic units and the accumulator unit, the reduction unit being configured to receive input operands from the arithmetic units and a first accumulator value from the accumulator unit;
   wherein the reduction unit is pipelined and operative to sum the input operands and the first accumulator value, and to generate a second accumulator value for delivery to the accumulator unit, the reduction unit further comprising m inputs, m adders, and an m stage pipeline, where m is greater than or equal to two, each of the m inputs being coupled to a corresponding adder by means of N−1 pipeline registers where N is a stage number greater than or equal to 1, the m stage pipeline being configured to reduce the worst case delay of the reduction unit;
   wherein the reduction unit is controllable to support saturation and wrap-around arithmetic; and
   wherein operations for a dot product computed for a given thread are executed concurrently with operations from other threads, the number of cycles between execution of instructions from the given thread being greater than or equal to a number of pipeline stages in the reduction unit plus any additional cycles needed to write to and read from the accumulator unit.

2. The processor of claim 1 wherein the plurality of arithmetic units comprises a plurality of multipliers arranged in parallel with one another.

3. The processor of claim 2 wherein the plurality of multipliers comprises a plurality of multiply-accumulate units arranged in parallel with one another.

4. The processor of claim 1 wherein the accumulator unit comprises an accumulator register file.

5. The processor of claim 1 wherein the reduction unit is configured to provide controllable selection between at least a first type of computation with saturation after each of a plurality of addition operations and a second type of computation with wrapping around of results of the addition operations, responsive to an applied control signal.

6. The processor of claim 1 wherein the reduction unit is further operative to permit the input operands to be subtracted from the first accumulator value.

7. The processor of claim 6 wherein the input operands are subtracted from the first accumulator value by inverting the bits of the input operands and setting a carry into each of a plurality of reduction adders of the reduction unit to a designated logic value.

8. The processor of claim 1 wherein the reduction unit is utilizable in conjunction with m arithmetic units and the accumulator unit to compute m elements of a dot product.

9. The processor of claim 8 wherein the m arithmetic units comprise m multipliers, with each of the multipliers being operative to compute $P[i]=X[i]*Y[i]$, $2 \leq i \leq m$, the P[i] outputs of the m multipliers being fed as input operands to the reduction unit along with an accumulator value P[0] from the accumulator unit, the reduction unit being configured to compute $Acc=P[0]+P[1]+P[2]+ \ldots +P[m]$, where P[0] is set to zero for an initial iteration, and in a next iteration, m new elements of X and Y are multiplied, and P[0] is set to accumulator value Acc from the previous iteration, the iterations continuing until the m-element dot product is computed.

10. The processor of claim 9 wherein the reduction unit is operable in a saturation mode in which the reduction unit performs saturation after each addition operation, and each of the m multipliers saturates its result when overflow occurs.

11. The processor of claim 9 wherein the reduction unit is operable in an invert mode in which the reduction unit is configured to compute $Acc=P[0]-P[1]-P[2]- \ldots -P[m]$.

12. The processor of claim 8 wherein the reduction unit is configured so as to allow m elements of the dot product to be accumulated on each of a plurality of processor clock cycles.

13. The processor of claim 1 wherein the reduction unit comprises m reduction adders connected in series, each of the reduction adders being operative to add its respective input operands with or without saturation.

14. The processor of claim 1 wherein the multithreaded processor utilizes token triggered threading.

15. The processor of claim 1 wherein the reduction unit is utilizable in execution of one or more vector-reduce instructions, including at least one of a vector-multiply-and-reduce-add instruction, a vector-multiply-and-reduce-subtract instruction, and a vector-add-reduce-add instruction.

16. An integrated circuit comprising at least one multithreaded processor, the multithreaded processor comprising:
a plurality of arithmetic units;
an accumulator unit; and
a reduction unit coupled between the plurality of arithmetic units and the accumulator unit, the reduction unit being pipelined and configured to receive input operands from the arithmetic units and a first accumulator value from the accumulator unit, the reduction unit further comprising m inputs, m adders, and an m stage pipeline, where m is greater than or equal to two, each of the m inputs being coupled to a corresponding adder by means of N−1 pipeline registers where N is a stage number greater than or equal to 1, the m stage pipeline being configured to reduce the worst case delay of the reduction unit;
wherein the reduction unit is operative to sum the input operands and the first accumulator value, and to generate a second accumulator value for delivery to the accumulator unit;
wherein the reduction unit is controllable to support saturation and wrap-around arithmetic; and
wherein operations for a dot product computed for a given thread are executed concurrently with operations from other threads, the number of cycles between execution of instructions from the given thread being greater than or equal to a number of pipeline stages in the reduction unit plus any additional cycles needed to write to and read from the accumulator unit.

17. An apparatus for use in a multithreaded processor comprising a plurality of arithmetic units and an accumulator unit, the apparatus comprising:
a reduction unit coupled between the plurality of arithmetic units and the accumulator unit, the reduction unit being pipelined and configured to receive input operands from the arithmetic units and a first accumulator value from the accumulator unit, the reduction unit further comprising m inputs, m adders, and an m stage pipeline, where m is greater than or equal to two, each of the m inputs being coupled to a corresponding adder by means of N−1 pipeline registers where N is a stage number greater than or equal to 1, the m stage pipeline being configured to reduce the worst case delay of the reduction unit;
wherein the reduction unit is operative to sum the input operands and the first accumulator value, and to generate a second accumulator value for delivery to the accumulator unit;
wherein the reduction unit is controllable to support saturation and wrap-around arithmetic; and
wherein operations for a dot product computed for a given thread are executed concurrently with operations from other threads, the number of cycles between execution of instructions from the given thread being greater than or equal to a number of pipeline stages in the reduction unit plus any additional cycles needed to write to and read from the accumulator unit.

* * * * *

UNITED STATES PATENT AND TRADEMARK OFFICE
CERTIFICATE OF CORRECTION

PATENT NO. : 7,593,978 B2  Page 1 of 1
APPLICATION NO. : 10/841261
DATED : September 22, 2009
INVENTOR(S) : Schulte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1285 days.

Signed and Sealed this

Twenty-eighth Day of September, 2010

David J. Kappos
*Director of the United States Patent and Trademark Office*